(12) United States Patent
Yokoyama et al.

(10) Patent No.: US 9,028,202 B2
(45) Date of Patent: May 12, 2015

(54) VARIABLE GEOMETRY TURBINE

(75) Inventors: Takao Yokoyama, Tokyo (JP); Hiroshi Suzuki, Tokyo (JP); Motoki Ebisu, Tokyo (JP); Toyotaka Yoshida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 167 days.

(21) Appl. No.: 13/807,258

(22) PCT Filed: Aug. 31, 2011

(86) PCT No.: PCT/JP2011/069817
§ 371 (c)(1),
(2), (4) Date: Feb. 11, 2013

(87) PCT Pub. No.: WO2012/043125
PCT Pub. Date: Apr. 5, 2012

(65) Prior Publication Data
US 2013/0294895 A1    Nov. 7, 2013

(30) Foreign Application Priority Data

Sep. 30, 2010    (JP) .................................. 2010-222496

(51) Int. Cl.
*F01D 17/16* (2006.01)
*F02C 6/12* (2006.01)
*F02B 37/24* (2006.01)

(52) U.S. Cl.
CPC ............... *F01D 17/165* (2013.01); *F02B 37/24* (2013.01); *F02C 6/12* (2013.01); *F05D 2220/40* (2013.01)

(58) Field of Classification Search
CPC ......... F01D 17/00; F01D 17/10; F01D 17/12; F01D 17/14; F01D 17/146; F01D 17/16; F01D 17/165; F02C 6/12; F05D 2220/40; F02B 37/24

USPC ......................................................... 415/163
See application file for complete search history.

(56) References Cited

U.S. PATENT DOCUMENTS

| 4,927,325 A | 5/1990 | Yano |
| 7,412,830 B2 | 8/2008 | Sumser |

FOREIGN PATENT DOCUMENTS

| EP | 0433560 A1 | 6/1991 |
| JP | 2000-8869 A | 1/2000 |

(Continued)

OTHER PUBLICATIONS

Extended European Search Report for European Patent Application No. 11828686.3, dated Feb. 10, 2014.

(Continued)

*Primary Examiner* — Nathaniel Wiehe
*Assistant Examiner* — Brian O Peters
(74) *Attorney, Agent, or Firm* — Birch, Stewart, Kolasch & Birch, LLP (57) ABSTRACT

A variable geometry turbine includes a fluid space formed by a nozzle mount and a nozzle plate; and a plurality of nozzle vanes arranged in the fluid space at certain intervals in the circumferential direction so as to partition the fluid space. The nozzle vanes are supported by shafts on the nozzle mount, in such a manner as to be capable of turning. The flow rate of the discharged fluid can be adjusted by opening or closing the cross-sectional area of a flow path formed by the adjacent nozzle vanes. The nozzle plate is provided with plate projections protruding toward the nozzle vanes further than, at least, end surfaces of the nozzle vanes, so as to cover the spaces between leading edges of the nozzle vanes and trailing edges of the nozzle vanes adjacent thereto, when the nozzle vanes are at a closed position.

8 Claims, 8 Drawing Sheets

(56) References Cited

FOREIGN PATENT DOCUMENTS

| JP | 2002-364374 A | 12/2002 |
|----|---------------|---------|
| JP | 2008-184971 A | 8/2008 |
| JP | 2009-243374 A | 10/2009 |
| JP | 101575990 A | 11/2009 |
| JP | 2010-96018 A | 4/2010 |
| JP | 2010-127093 A | 6/2010 |
| JP | 2010-180811 A | 8/2010 |
| WO | WO 03/074850 A1 | 9/2003 |

OTHER PUBLICATIONS

Japanese Decision to Grant a Patent, issued Mar. 11, 2014, for Japanese Application No. 2010-222496.

Chinese Patent Office Action dated Jun. 13, 2014 issued in Chinese Patent Application No. 2011-80032575.6.

VARIABLE GEOMETRY TURBINE

TECHNICAL FIELD

The present invention relates to variable geometry turbines.

BACKGROUND ART

A radial turbine has a configuration in which a plurality of centrifugal blades are fixed to a hub secured to a rotating shaft, and in which working fluid, i.e., air or gas, flowing from the radially outer circumferential side toward the inner side through a flow path between a nozzle mount and a nozzle plate, which have a ring-like shape and are provided substantially parallel to each other, acts on the centrifugal blades to rotate the hub and is discharged substantially in an axial direction.

In the flow path between the circular plates, a plurality of nozzle vanes for accelerating the working fluid are arranged with gaps therebetween in the circumferential direction.

A variable geometry radial turbine has a configuration in which the nozzle vanes are supported by shafts on the nozzle mount and turn on the shafts to open or close throat spaces formed by adjacent nozzle vanes, thereby enabling adjustment of the flow rate, flow velocity, etc., of the fluid discharged.

In the variable geometry radial turbine, because the nozzle vanes turn in this way, end surfaces of the nozzle vanes move along the nozzle mount and the nozzle plate accordingly. Therefore, in order to prevent the drawback that the end surfaces of the nozzle vanes touch the nozzle mount and the nozzle plate, thus becoming immobilized, gaps must be provided between the end surfaces of the nozzle vanes and the nozzle mount and between the end surfaces of the nozzle vanes and the nozzle plate.

These gaps serve as fluid leakage paths and, thus, decrease the efficiency of the variable geometry radial turbine. The influence of this decrease is significant particularly when the flow rate is low, i.e., when the nozzle vanes are closed.

For example, PTL (Patent Literature) 1 proposes a turbine that suppresses fluid leakage when the nozzle vanes are closed, thereby suppressing a decrease in efficiency occurring when the flow rate is low.

The turbine suppresses fluid leakage from the gaps by providing plate-like projections on leading edges of nozzle vanes and on trailing edges of nozzle vanes adjacent thereto when the nozzle vanes are at a closed position.

CITATION LIST

Patent Literature

{PTL 1} Japanese Unexamined Patent Application, Publication No. 2010-96018

SUMMARY OF INVENTION

Technical Problem

Incidentally, because the thickness of the trailing edges of the nozzle vanes relative to the throat width of the throat spaces (the distance between the nozzle vanes) is relatively large when the nozzle vanes are in a closed state (when the degree of opening of the nozzle vanes is small), the rate of widening of the fluid exiting the throat spaces is high. When the rate of widening increases in this way, a large wake is generated, which degrades the performance of the variable geometry radial turbine.

Although the turbine disclosed in PTL 1 can suppress fluid leakage by means of the plate-like projections, the influence thereof on the throat width is small, and generation of a wake is not taken into consideration. Thus, there is a problem in that degradation in performance of the variable geometry radial turbine is inevitable.

The present invention has been made in view of these circumstances, and an object thereof is to provide a variable geometry turbine that can suppress fluid leakage from gaps existing at end surfaces of the nozzle vanes and that can suppress the generation of a wake.

Solution to Problem

To overcome the above-described problem, the present invention employs the following solutions.

More specifically, one aspect of the present invention is a variable geometry turbine including a fluid space that is formed in a donut shape by a pair of ring-like opposing surfaces arranged to face each other with a certain distance therebetween and that allows fluid flowing from an outer circumferential side to be discharged toward an inner circumferential side; and a plurality of nozzle vanes arranged in the fluid space at certain intervals in a circumferential direction so as to partition the fluid space, the nozzle vanes being supported by shafts on one of the opposing surfaces in such a manner as to be capable of turning. The nozzle vanes are made to turn on the shafts to open or close throat spaces formed by adjacent nozzle vanes, so that the flow rate of the fluid can be adjusted. At least one of the pair of opposing surfaces is provided with projections protruding toward the nozzle vanes further than, at least, end surfaces of the nozzle vanes, so as to cover spaces between leading edges of the nozzle vanes and trailing edges of the nozzle vanes adjacent thereto when the nozzle vanes are at a closed position.

In this aspect, at least one of the pair of opposing surfaces is provided with the projections that cover the spaces between the leading edges of the nozzle vanes and the trailing edges of the nozzle vanes adjacent thereto when the nozzle vanes are at a closed position. Therefore, when the nozzle vanes are in a closed state, the projections exist next to the nozzle vanes. Because the projections protrude toward the nozzle vanes further than, at least, the end surfaces of the nozzle vanes, the projections can cover the gaps between the nozzle vanes and the opposing surfaces. Accordingly, because the projections can suppress fluid leakage from these gaps, it is possible to suppress a decrease in efficiency of the variable geometry turbine occurring when the flow rate is low.

Furthermore, because the projections are provided so as to cover the spaces between the leading edges of the nozzle vanes and the trailing edges of the nozzle vanes adjacent thereto when the nozzle vanes are at a closed position, it is possible to reduce, by a corresponding amount, the height of the throat spaces when the nozzle vanes are in a closed state. If the height of the throat spaces is decreased, in the case where the same flow rate, i.e., the throat spaces having the same area, is to be obtained, the throat width, in other words, the degree of opening of the nozzle vanes, can be increased. Thus, the thickness of the trailing edges of the nozzle vanes relative to the throat width of the throat spaces (the distance between the nozzle vanes) can be relatively reduced. As a result, because the rate of widening of the fluid exiting the throat spaces decreases, it is possible to suppress the generation of a wake and to improve the performance of the variable geometry radial turbine.

In the above-described aspect, tapered outer-circumferential surfaces that are tapered toward the projections so as to approach the nozzle vanes may be provided on the outer circumferential side of the projections.

As above, because the tapered outer-circumferential surfaces that are tapered toward the projections so as to approach the nozzle vanes are provided on the outer circumferential side of the projections, the fluid leaking through the gaps collides with the projections via the tapered outer-circumferential surfaces. Because this fluid flows toward the nozzle vanes, i.e., toward the tips of the projections, via the tapered outer-circumferential surfaces, it is possible to suppress a sudden change in the flow direction at the projections. Therefore, because a sudden change in direction of the fluid at the projections is suppressed, it is possible to suppress separation of the fluid flow and to reduce the loss.

Furthermore, because the outer circumferential side portions of the projections are in the areas in which the leading edges of the nozzle vanes move, if the degree of opening of the nozzle vanes increases beyond a level at which it does not affect a decrease in efficiency, the distance between the nozzle vanes and the opposing surfaces increases. If the distance between the nozzle vanes and the opposing surfaces increases, the amount of fluid passing therethrough increases, and thus, it is possible to increase the flow rate of the fluid supplied from the nozzle vanes.

On the other hand, if the degree of opening of the nozzle vanes decreases, the distance between the nozzle vanes and the opposing surfaces decreases. Thus, the amount of fluid leakage can be further reduced, and, in association with the projections, it is possible to further suppress a decrease in efficiency of the variable geometry turbine occurring when the flow rate is low.

Moreover, because the distance between the nozzle vanes and the opposing surfaces can be changed in a continuous manner, by adjusting the inclination, areas, etc., of the tapered outer-circumferential surfaces, control of the flow rate of the fluid can be easily performed.

Note that it is preferable that the tapered outer-circumferential surfaces be provided, at least, in an area in which the leading edges of the nozzle vanes move.

In the above-described aspect, tapered inner-circumferential surfaces that are tapered toward the projections so as to approach the nozzle vanes may be provided on the inner circumferential side of the projections.

As above, because the tapered inner-circumferential surfaces that are tapered toward the projections so as to approach the nozzle vanes are provided on the inner circumferential side of the projections, the fluid in the throat portions leaks out into the space between the tapered inner-circumferential surfaces and the nozzle vanes via the projections. Because portions of the tapered inner-circumferential surfaces close to the projections are located closer to the nozzle vanes, i.e., the tips of the projections, the fluid smoothly moves from the projections to the tapered inner-circumferential surface. Thus, because it is possible to suppress a sudden change in direction of the fluid exiting the projections, it is possible to suppress separation of the fluid flow and to reduce the loss.

Furthermore, because the portions on the inner circumferential side of the projections are in the areas in which the trailing edges of the nozzle vanes move, if the degree of opening of the nozzle vanes increases beyond a level at which it does not affect a decrease in efficiency, the distance between the nozzle vanes and the opposing surfaces increases. Because an increase in the distance between the nozzle vanes and the opposing surfaces allows more fluid to flow therebetween, the flow rate of fluid supplied from the nozzle vanes can be increased.

On the other hand, if the degree of opening of the nozzle vanes decreases, the distance between the nozzle vanes and the opposing surfaces decreases. Thus, the amount of fluid leakage can be further reduced, and, in association with the projections, it is possible to further suppress a decrease in efficiency of the variable geometry turbine occurring when the flow rate is low.

Moreover, because the distance between the nozzle vanes and the opposing surfaces can be changed in a continuous manner, by adjusting the inclination, areas, etc., of the tapered outer-circumferential surfaces, control of the flow rate of the fluid can be easily performed.

Note that it is preferable that the tapered inner-circumferential surfaces be provided, at least, in an area in which the trailing edges of the nozzle vanes move.

In the above-described aspect, the projections may cover portions from the leading edges or the trailing edges of the nozzle vanes to positions near the shafts, in the chord direction of the nozzle vanes.

With this configuration, the projections can cover substantially the entire area of the nozzle vanes in the chord direction of the nozzle vanes. Accordingly, because the gaps between the nozzle vanes and the opposing surfaces can be substantially completely covered, it is possible to further suppress a decrease in efficiency of the variable geometry turbine occurring when the flow rate is low.

Advantageous Effects of Invention

According to the present invention, at least one of the pair of opposing surfaces is provided with projections protruding toward the nozzle vanes further than, at least, the end surfaces of the nozzle vanes, so as to cover the spaces between the leading edges of the nozzle vanes and the trailing edges of the nozzle vanes adjacent thereto when the nozzle vanes are at a closed position. Thus, it is possible to suppress a decrease in efficiency of the variable geometry turbine occurring when the flow rate is low. Furthermore, the performance of the variable geometry radial turbine can be improved.

DESCRIPTION OF EMBODIMENTS

Embodiments of the present invention will be described in detail below with reference to the attached drawings.

[First Embodiment]

A variable geometry turbocharger having a variable geometry radial turbine 1 according to a first embodiment of the present invention will be described with reference to FIGS. 1 to 4.

Figure 1:
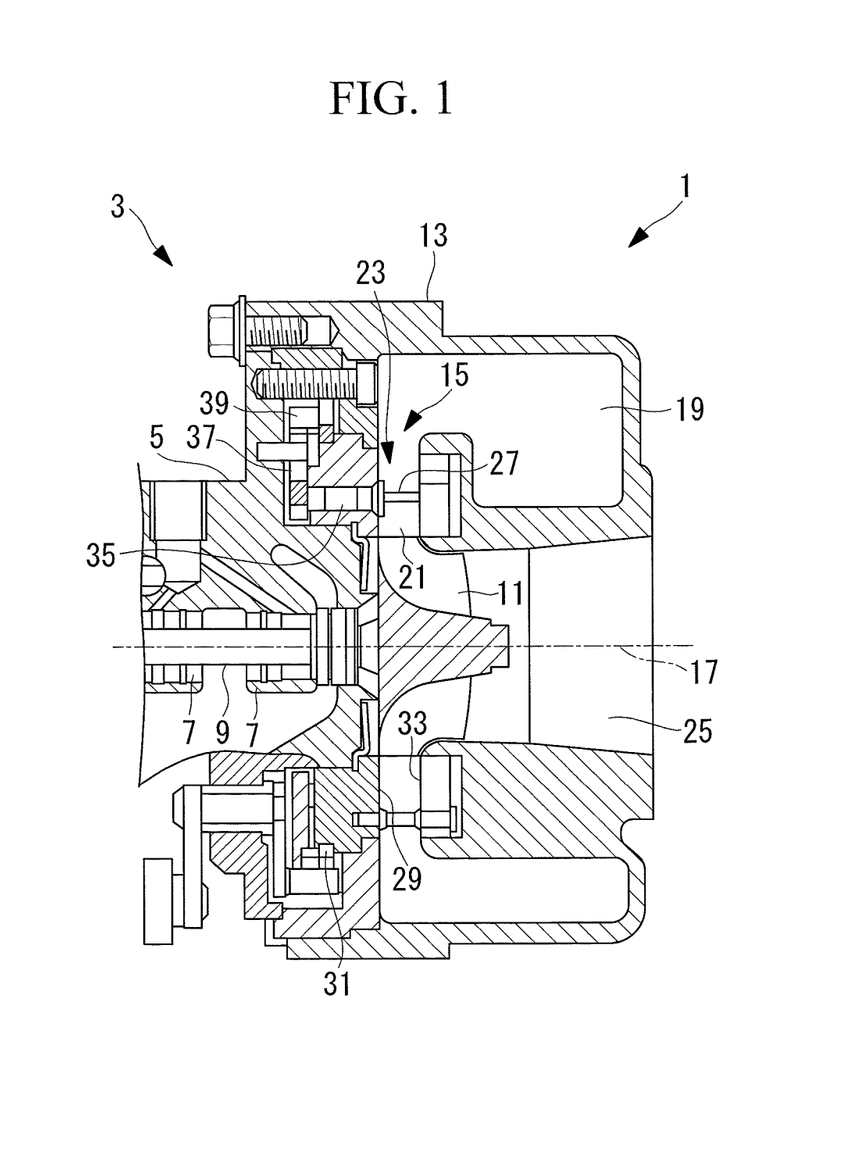
FIG. 1 is a partial sectional view showing, in outline, the configuration of a variable geometry radial turbine side of a variable geometry exhaust turbocharger according to a first embodiment of the present invention.
Figure 2:
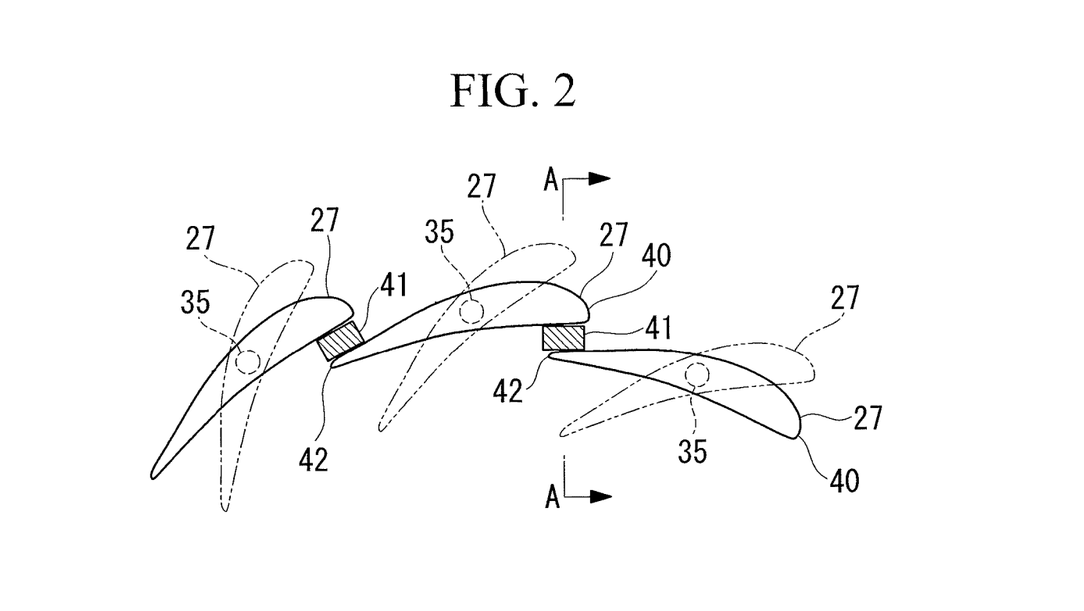
FIG. 2 is a plan view showing some of the nozzle vanes in FIG. 1.
Figure 3:
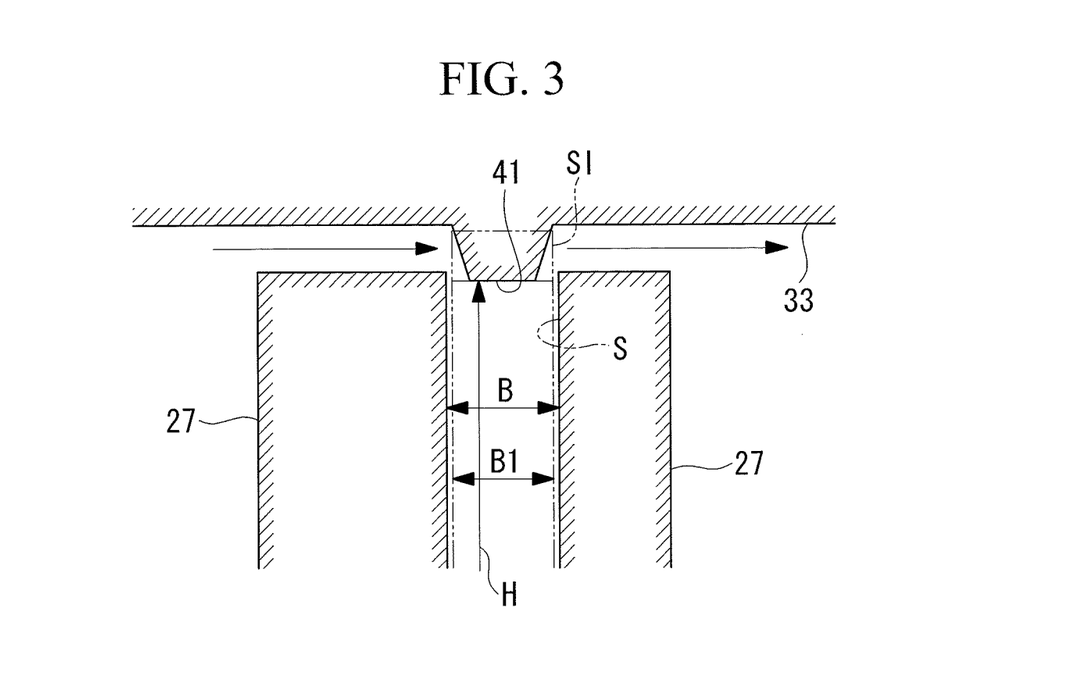
FIG. 3 is a cross-sectional view taken along line A-A in FIG. 2.
Figure 4:
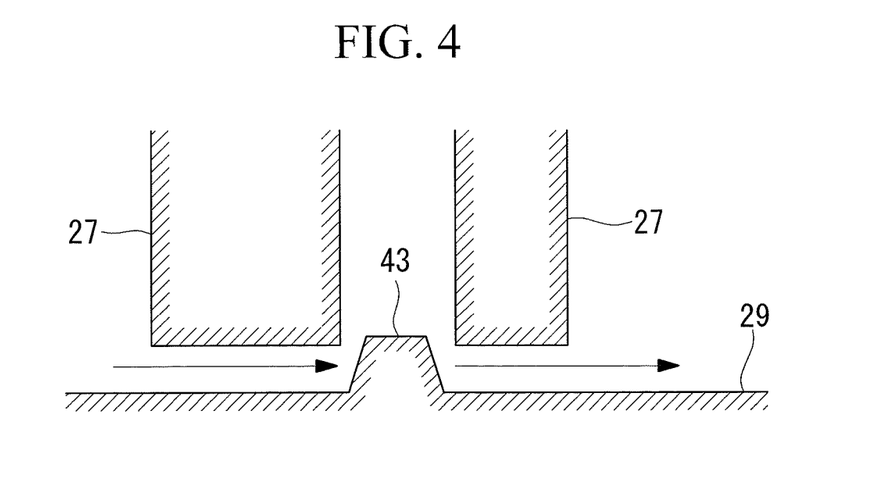
FIG. 4 is a cross-sectional view showing a nozzle mount portion.

FIG. 1 is a partial sectional view showing, in outline, the configuration of a variable geometry radial turbine side of a variable geometry exhaust turbocharger according to a first embodiment of the present invention. FIG. 2 is a plan view showing some of the nozzle vanes in FIG. 1. FIG. 3 is a cross-sectional view taken along line A-A in FIG. 2. FIG. 4 is a cross-sectional view showing a nozzle mount portion.

A variable geometry turbocharger 3 includes the variable geometry radial turbine 1 and a compressor (not shown).

The variable geometry radial turbine 1 and the compressor are joined via a bearing housing 5. A turbine rotor 9 supported in a rotatable manner by a bearing 7 passes through the bearing housing 5.

The compressor includes a compressor wheel (not shown) attached to one end of the turbine rotor 9, and a compressor casing (not shown) provided so as to enclose and cover the compressor wheel.

On the other hand, the variable geometry radial turbine 1 includes a turbine wheel 11 attached to the other end of the turbine rotor 9, a turbine casing 13 provided so as to enclose and cover the turbine wheel 11, and a variable nozzle mechanism 15 that varies the flow-path cross-sectional area (throat area) S for the exhaust gas (fluid) flowing into the turbine wheel 11.

Inside the turbine casing 13, a scroll 19 is formed so as to surround the outer periphery of the turbine wheel 11, around a rotation axis 17 of the turbine rotor 9. This scroll 19 and a turbine wheel inlet 21 communicate with each other through a fluid inlet flow path (fluid space) 23.

Furthermore, an exhaust gas inlet (not shown) extending generally in a tangential direction of the scroll 19 is provided on the outer circumferential side of the scroll 19, and an exhaust gas outlet 25 is provided along the rotation axis 17 of the turbine rotor 9.

The variable nozzle mechanism 15 includes a plurality of nozzle vanes 27 having a blade shape in cross-section, as shown in FIG. 2, a nozzle mount (opposing surface) 29 having a ring shape in cross-section, a drive ring 31 having a ring shape in cross-section, and a nozzle plate (opposing surface) 33 having a ring shape in cross-section.

The nozzle mount 29 and the nozzle plate 33 are arranged to face each other, forming a donut-shaped fluid inlet flow path 23.

The nozzle vanes 27 are arranged in the fluid inlet flow path 23 at equal intervals in the circumferential direction, and shafts 35 are provided on end surfaces of the nozzle vanes 27, on the nozzle mount 29 side. The shafts 35 are supported at the end surface of the nozzle mount 29 in a rotatable manner.

Ends of the shafts 35 are fixed to ends of lever plates 37. The other ends of the lever plates 37 are engaged with drive pins 39 that are securely attached to the drive ring 31.

The drive ring 31 is supported by the turbine casing 13 in a rotatable manner and is rotated by an actuator (illustration thereof is omitted). When the drive ring 31 is rotated, the drive pins 39 move, and therefore, the lever plates 37 move. When the lever plates 37 move, the shafts 35 rotate, and the nozzle vanes 27 turn on the shafts 35. As a result, the degree of opening of the nozzle vanes 27 is adjusted, in other words, the flow-path cross-sectional area S formed by adjacent nozzle vanes is adjusted.

As shown in FIGS. 2 and 3, the nozzle plate 33 is provided with plate projections (projections) 41.

As shown in FIG. 2, the plate projections 41 are provided so as to cover the entire spaces between leading edges 40 of the nozzle vanes 27 and trailing edges 42 of the nozzle vanes 27 adjacent thereto when the nozzle vanes 27 are at a closed position.

As shown in FIG. 3, tips of the plate projections 41 are configured to protrude toward the nozzle vanes 27 further than the end surfaces of the nozzle vanes 27.

As shown in FIG. 4, the nozzle mount 29 is provided with mount projections (projections) 43.

The mount projections 43 are provided so as to cover the entire spaces between the leading edges 40 of the nozzle vanes 27 and the trailing edges 42 of the nozzle vanes 27 adjacent thereto when the nozzle vanes 27 are at a closed position.

As shown in FIG. 4, tips of the mount projections 43 are configured to protrude toward the nozzle vanes 27 further than the end surfaces of the nozzle vanes 27.

The operation of the thus-configured variable geometry radial turbine 1 according to this embodiment and a variable geometry turbocharger having the same will now be described.

Exhaust gas from an engine (illustration thereof is omitted) enters the scroll 19 and, while circulating along a spiral path of the scroll 19, flows into the fluid inlet flow path 23.

The exhaust gas flowing into the fluid inlet flow path 23 is accelerated by the nozzle vanes 27 and flows into the turbine wheel 11 from the outer circumferential side thereof. This exhaust gas flows radially toward the center of the turbine wheel 11 and serves as expansion work acting on the turbine wheel 11, after which the exhaust gas flows axially to the outside by being guided by the exhaust gas outlet 25.

During this process, the capacity of the variable geometry radial turbine is controlled in the following manner. When the actuator (not shown) is activated to rotate the drive ring 31, the drive pins 39 are moved. The movement of the drive pins 39 causes the lever plates 37 to pivot about the shafts 35, making the shafts 35 rotate. The rotation of the shafts 35 causes the nozzle vanes 27 to turn on the shafts 35. Thus, the blade angle of the nozzle vanes 27 is changed, and the degree of opening of the nozzle vanes 27 is adjusted. The flow-path cross-sectional area S formed between the nozzle vanes 27 is adjusted, and the flow rate is adjusted.

In this embodiment, the plate projections 41 and the mount projections 43 are provided on the nozzle plate 33 and the nozzle mount 29, respectively, so as to cover the spaces between the leading edges 40 of the nozzle vanes 27 and the trailing edges 42 of the nozzle vanes 27 adjacent thereto when the nozzle vanes 27 are at a closed position. Thus, when the nozzle vanes 27 are in a closed state, as shown in FIG. 2, the plate projections 41 and the mount projections 43 exist next to the nozzle vanes 27.

Because the tips of the plate projections 41 and mount projections 43 protrude toward the nozzle vanes 27 further than the end surfaces of the nozzle vanes 27, the plate projections 41 and the mount projections 43 can cover the gap between the nozzle vanes 27 and the nozzle plate 33 and the gap between the nozzle vanes 27 and the nozzle mount 29. Accordingly, because the plate projections 41 and the mount projections 43 can suppress fluid leakage from these gaps, it is possible to suppress a decrease in efficiency of the variable geometry radial turbine 1 occurring when the flow rate is low.

Furthermore, because the plate projections 41 and the mount projections 43 are provided so as to cover the spaces between the leading edges 40 of the nozzle vanes 27 and the trailing edges 42 of the nozzle vanes 27 adjacent thereto when the nozzle vanes 27 are at a closed position, it is possible to reduce the height, H, of the flow-path cross-sectional area S, by the corresponding amount, when the nozzle vanes 27 are in a closed state.

FIG. 3 shows a flow-path cross-sectional area, S1, having the same area as the flow-path cross-sectional area S according to this embodiment, but without the plate projections 41 or the mount projections 43. Comparison of the two shows that, because the flow-path cross-sectional area S has a smaller height H, the throat width B is larger than the throat width B1.

As in this case, if the height of the flow-path cross-sectional area S is decreased, in the case where the same flow rate, i.e., the same flow-path cross-sectional area S, is to be obtained, the throat width B, in other words, the degree of opening of the nozzle vanes 27, can be increased.

Thus, the thickness of the trailing edges 42 of the nozzle vanes 27 relative to the throat width B can be relatively reduced. Because the rate of widening of the exhaust gas exiting the nozzle vanes 27 decreases as a result of this, it is possible to suppress the generation of a wake and to improve the performance of the variable geometry radial turbine 1.

Note that, although the plate projections 41 are provided on the nozzle plate 33, and the mount projections 43 are provided on the nozzle mount 29 in this embodiment, the configuration is not limited thereto; either one of the plate projections 41 and the mount projections 43 may be provided.

[Second Embodiment]

Figure 6:
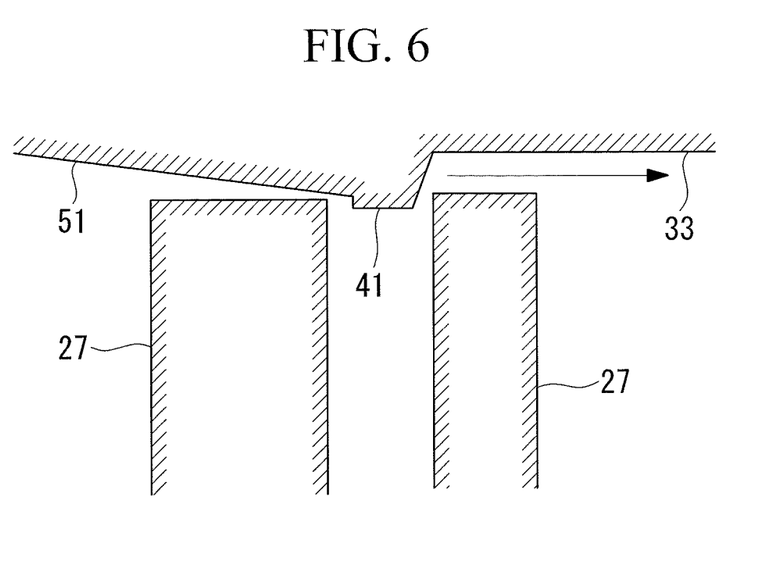
FIG. 6 is a cross-sectional view taken along line B-B in FIG. 5.
Figure 7:
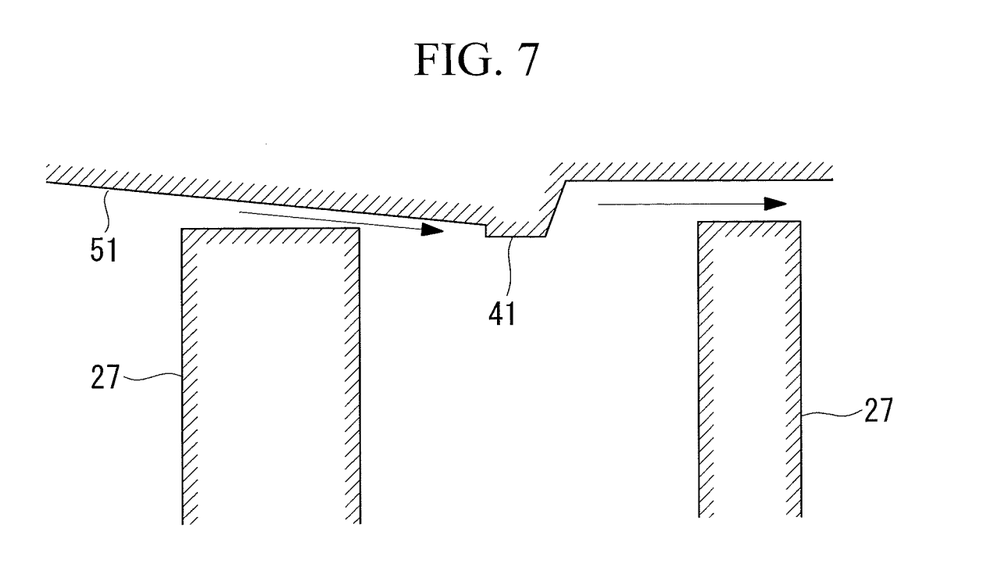
FIG. 7 is a cross-sectional view taken along line C-C in FIG. 5.

Next, a variable geometry turbocharger having a variable geometry radial turbine 1 according to a second embodiment of the present invention will be described with reference to FIGS. 5 to 7.

Because this embodiment differs from the first embodiment in the configuration of the nozzle plate 33, the differences will be mainly described in this section, and overlapping descriptions of commonalities with the above-described first embodiment will be omitted.

Note that components in common with those of the first embodiment will be denoted by the same reference numerals.

Figure 5:
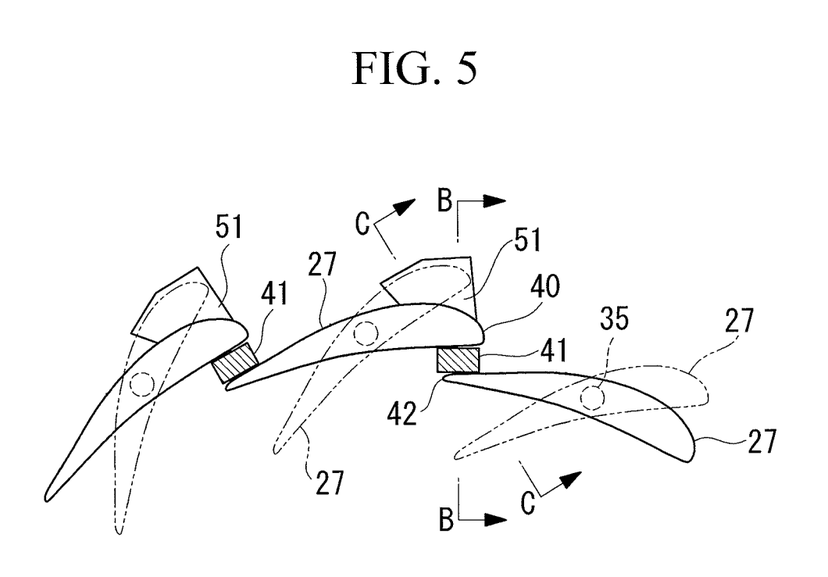
FIG. 5 is a plan view showing some of the nozzle vanes of a variable geometry radial turbine according to a second embodiment of the present invention.

FIG. 5 is a plan view showing some of the nozzle vanes of the variable geometry radial turbine 1 according to this embodiment. FIG. 6 is a cross-sectional view taken along line B-B in FIG. 5. FIG. 7 is a cross-sectional view taken along line C-C in FIG. 5.

In this embodiment, the nozzle plate 33 has tapered outer-circumferential surfaces 51 formed on the outer circumferential side of the plate projections 41 and tapered toward the plate projections 41 so as to approach the nozzle vanes 27.

As shown in FIG. 5, the tapered outer-circumferential surfaces 51 are provided in areas in which the leading edges 40 of the nozzle vanes 27 move in response to opening or closing of the nozzle vanes 27.

At the boundary positions between the tapered outer-circumferential surfaces 51 and the plate projections 41, the tapered outer-circumferential surfaces 51 and the nozzle vanes 27 are separated by a gap so that they do not touch each other.

When the mount projections 43 are provided, tapered surfaces equivalent to the tapered outer-circumferential surfaces 51 may be provided on the outer circumferential side of the mount projections 43.

Effects and advantages of the thus-configured variable geometry radial turbine 1 according to this embodiment will now be described.

Exhaust gas leaking through the gap between the nozzle plate 33 and the nozzle vanes 27 collides with the plate projections 41 via the tapered outer-circumferential surfaces 51. Because this exhaust gas flows toward the nozzle vanes 27, i.e., toward the tips of the plate projections 41, via the tapered outer-circumferential surfaces 51, it is possible to suppress a sudden change in the flow direction at the plate projections 41. Therefore, because a sudden change in direction of the exhaust gas at the plate projections 41 is suppressed, it is possible to suppress separation of the fluid flow and to reduce the loss.

Furthermore, because the tapered outer-circumferential surfaces 51 are in the areas in which the leading edges 40 of the nozzle vanes 27 move, if the degree of opening of the nozzle vanes 27 increases beyond a level at which it does not affect a decrease in efficiency, the distance between the nozzle vanes 27 and the nozzle plate 33 increases. Because an increase in the distance between the nozzle vanes 27 and the nozzle plate 33 allows more fluid to flow therebetween, the flow rate of the exhaust gas supplied from the nozzle vanes 27 to the turbine wheel 11 can be increased.

On the other hand, if the degree of opening of the nozzle vanes 27 decreases, the distance between the nozzle vanes 27 and the nozzle plate 33 decreases. Thus, it is possible to further reduce the amount of leakage of the exhaust gas, and, in association with the plate projections 41, it is possible to further suppress a decrease in efficiency of the variable geometry radial turbine 1 occurring when the flow rate is low.

Moreover, because the distance between the nozzle vanes 27 and the nozzle plate 33 can be changed in a continuous manner, by adjusting the inclination, areas, etc., of the tapered outer-circumferential surfaces 51, control of the flow rate of the exhaust gas can be easily performed.

[Third Embodiment]

Figure 9:
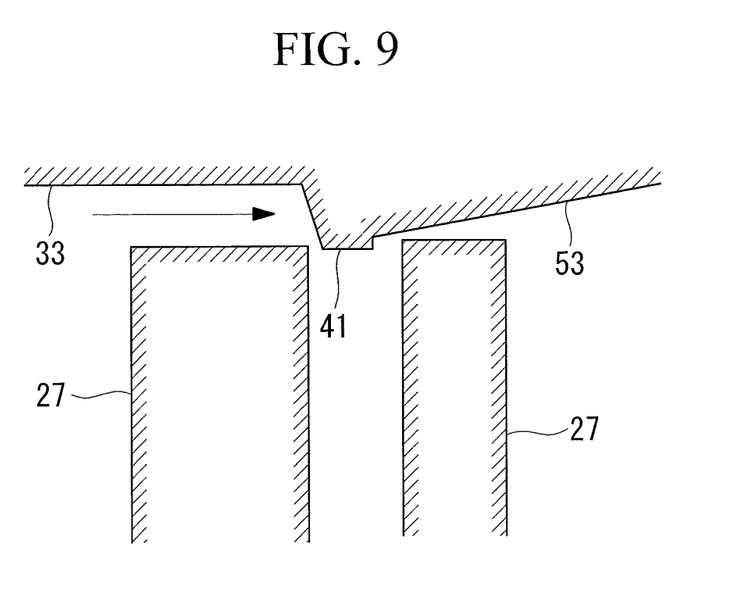
FIG. 9 is a cross-sectional view taken along line D-D in FIG. 8.
Figure 10:
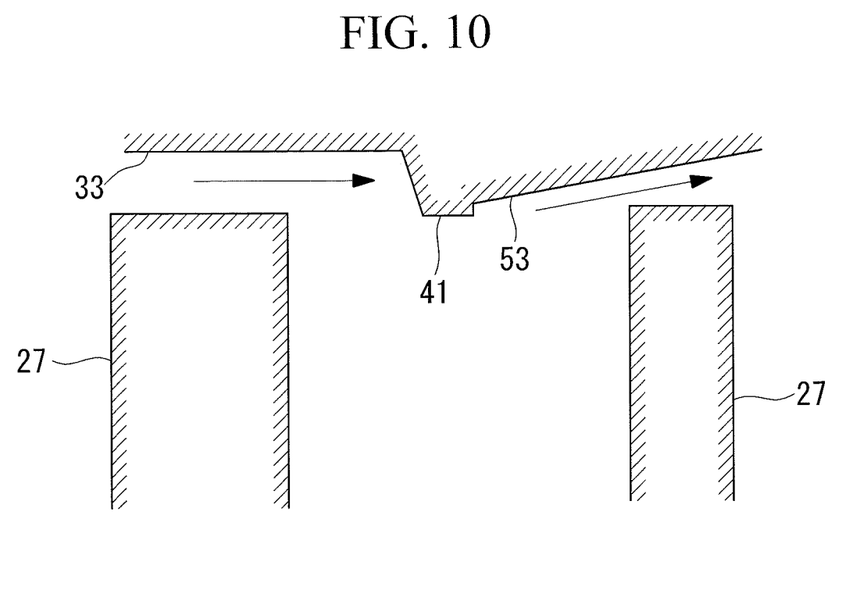
FIG. 10 is a cross-sectional view taken along line E-E in FIG. 8.

Next, a variable geometry turbocharger having a variable geometry radial turbine 1 according to a third embodiment of the present invention will be described with reference to FIGS. 8 to 10.

Because this embodiment differs from the first embodiment in the configuration of the nozzle plate 33, the differences will be mainly described in this section, and overlapping descriptions of commonalities with the above-described first embodiment will be omitted.

Note that components in common with those of the first embodiment will be denoted by the same reference numerals.

Figure 8:
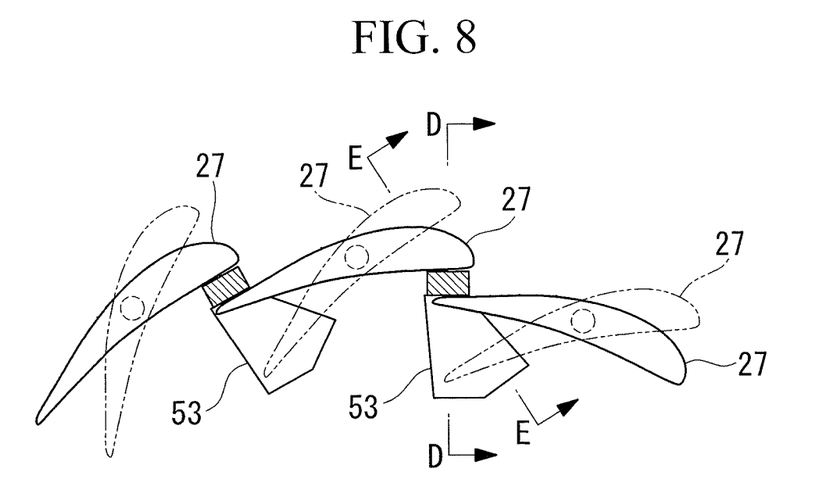
FIG. 8 is a plan view showing some of the nozzle vanes of a variable geometry radial turbine according to a third embodiment of the present invention.

FIG. 8 is a plan view showing some of the nozzle vanes of the variable geometry radial turbine 1 according to this embodiment. FIG. 9 is a cross-sectional view taken along line D-D in FIG. 8. FIG. 10 is a cross-sectional view taken along line E-E in FIG. 8.

In this embodiment, the nozzle plate 33 has tapered inner-circumferential surfaces 53 formed on the inner circumferential side of the plate projections 41 and tapered toward the plate projections 41 so as to approach the nozzle vanes 27.

As shown in FIG. 8, the tapered inner-circumferential surfaces 53 are provided in areas in which the trailing edges 42 of the nozzle vanes 27 move in response to opening or closing of the nozzle vanes 27.

At the boundary positions between the tapered inner-circumferential surfaces 53 and the plate projections 41, the tapered inner-circumferential surfaces 53 and the nozzle vanes 27 are separated by a gap so that they do not touch each other.

When the mount projections 43 are provided, tapered surfaces equivalent to the tapered inner-circumferential surfaces 53 may be provided on the inner circumferential side of the mount projections 43.

Effects and advantages of the thus-configured variable geometry radial turbine 1 according to this embodiment will now be described.

Exhaust gas between the nozzle plate 33 leaks out through the gap between the nozzle plate 33 and the nozzle vanes 27. Because portions of the tapered inner-circumferential surfaces 53 close to the plate projections 41 are located closer to the nozzle vanes 27, i.e., the tips of the plate projections 41, the exhaust gas smoothly moves from the plate projections 41 to the tapered inner-circumferential surfaces 53. Thus, because it is possible to suppress a sudden change in direction of the exhaust gas flow exiting the plate projections 41 through the gap, it is possible to suppress separation of the exhaust gas flow and to reduce the loss.

Furthermore, because the tapered inner-circumferential surfaces 53 are in the areas in which the trailing edges 42 of the nozzle vanes 27 move, if the degree of opening of the nozzle vanes 27 increases beyond a level at which it does not affect a decrease in efficiency, the distance between the nozzle vanes 27 and the nozzle plate 33 increases. Because an increase in the distance between the nozzle vanes 27 and the nozzle plate 33 allows more fluid to flow therebetween, the flow rate of the exhaust gas supplied from the nozzle vanes 27 to the turbine wheel 11 can be increased.

On the other hand, if the degree of opening of the nozzle vanes 27 decreases, the distance between the nozzle vanes 27 and the nozzle plate 33 (tapered inner-circumferential surfaces 53) decreases. Thus, it is possible to further reduce the amount of leakage of the exhaust gas, and, in association with the plate projections 41, it is possible to further suppress a decrease in efficiency of the variable geometry radial turbine 1 occurring when the flow rate is low.

Moreover, because the distance between the nozzle vanes 27 and the nozzle plate 33 can be changed in a continuous manner, by adjusting the inclination, areas, etc., of the tapered inner-circumferential surfaces 53, control of the flow rate of the exhaust gas can be easily performed.

[Fourth Embodiment]

Figure 12:
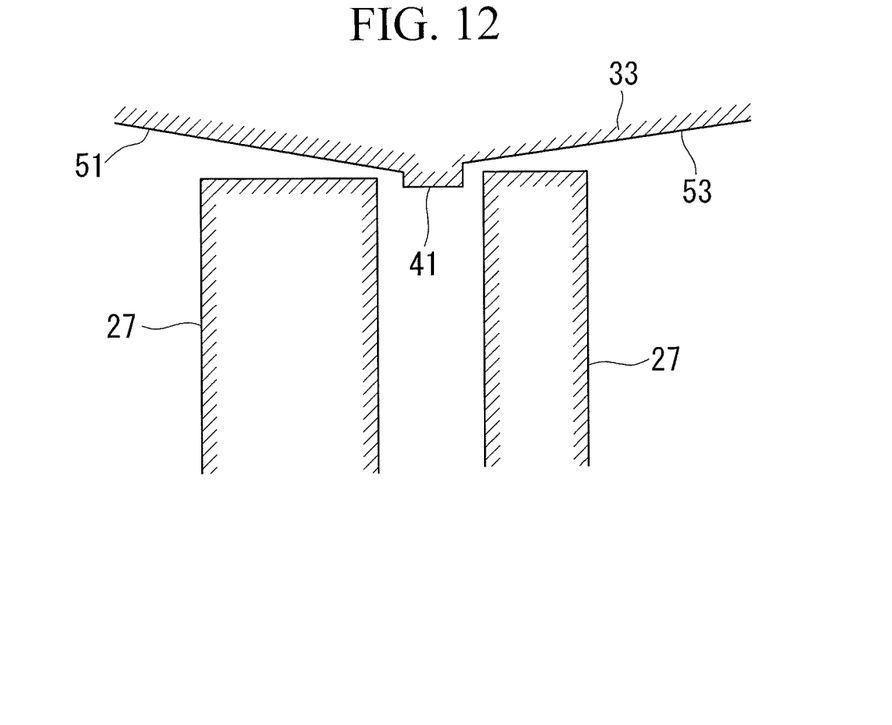
FIG. 12 is a cross-sectional view taken along line F-F in FIG. 11.
Figure 13:
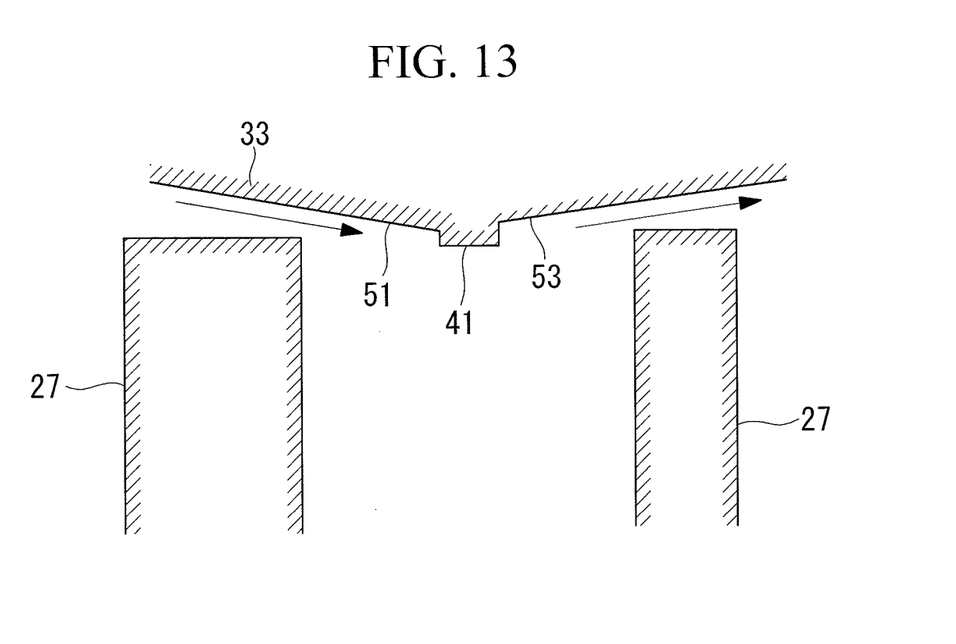
FIG. 13 is a cross-sectional view taken along line G-G in FIG. 11.

Next, a variable geometry turbocharger having a variable geometry radial turbine 1 according to a fourth embodiment of the present invention will be described with reference to FIGS. 11 to 13.

Because this embodiment differs from the first embodiment in the configuration of the nozzle plate 33, the differences will be mainly described in this section, and overlapping descriptions of commonalities with the above-described first embodiment will be omitted.

Note that components in common with those of the first embodiment will be denoted by the same reference numerals.

Figure 11:
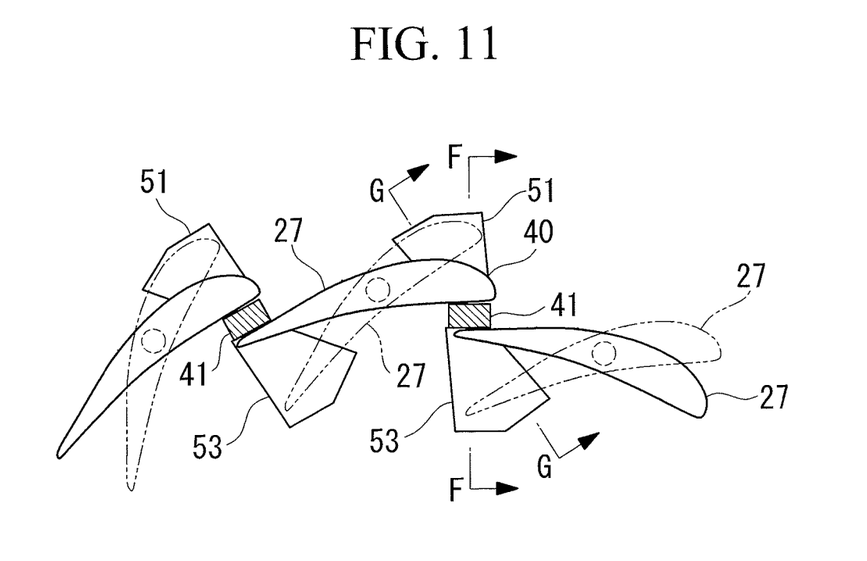
FIG. 11 is a plan view showing some of the nozzle vanes of a variable geometry radial turbine according to a fourth embodiment of the present invention.

FIG. 11 is a plan view showing some of the nozzle vanes of the variable geometry radial turbine 1 according to this embodiment. FIG. 12 is a cross-sectional view taken along line F-F in FIG. 11. FIG. 13 is a cross-sectional view taken along line G-G in FIG. 11.

In this embodiment, in addition to the configuration of the first embodiment, the tapered outer-circumferential surfaces 51 of the second embodiment and the tapered inner-circumferential surfaces 53 of the third embodiment are provided.

As shown in FIG. 11, the tapered outer-circumferential surfaces 51 are provided in areas in which the leading edges 40 of the nozzle vanes 27 move in response to opening or closing of the nozzle vanes 27.

As shown in FIG. 11, the tapered inner-circumferential surfaces 53 are provided in areas in which the trailing edges 42 of the nozzle vanes 27 move in response to opening or closing of the nozzle vanes 27.

When the mount projections 43 are provided, tapered surfaces equivalent to the tapered outer-circumferential surfaces 51 may be provided on the outer circumferential side of the mount projections 43, and the tapered inner-circumferential surfaces 53 may be provided on the inner circumferential side of the mount projections 43.

Effects and advantages of the thus-configured variable geometry radial turbine 1 according to this embodiment include those according to the above-described second embodiment and third embodiment. Thus, overlapping descriptions will be omitted in this section.

[Fifth Embodiment]

Figure 14:
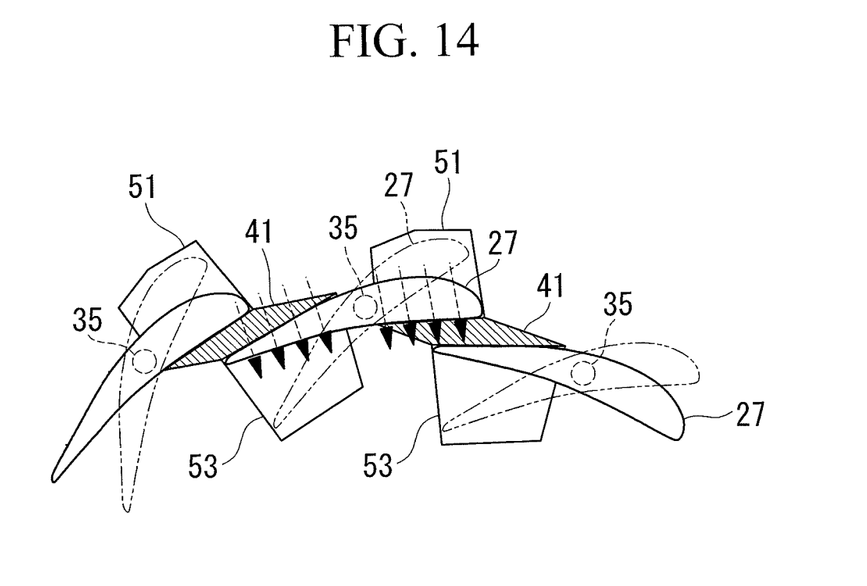
FIG. 14 is a plan view showing some of the nozzle vanes of a variable geometry radial turbine according to a fifth embodiment of the present invention.

Next, a variable geometry turbocharger having a variable geometry radial turbine 1 according to a fifth embodiment of the present invention will be described with reference to FIG. 14.

Because this embodiment differs from the fourth embodiment in the configuration of the nozzle plate 33, the differences will be mainly described in this section, and overlapping descriptions of commonalities with the above-described first embodiment will be omitted.

Note that components in common with those of the fourth embodiment will be denoted by the same reference numerals.

In this embodiment, the plate projections 41 are configured to cover areas from the leading edges 40 or trailing edges 42 of the nozzle vanes 27 to positions near the shafts 35, in a chord direction of the nozzle vanes 27. In accordance with this, the lengths of the tapered outer-circumferential surfaces 51 and the tapered inner-circumferential surfaces 53 in the chord direction of the nozzle vanes 27 are set to be large.

When the mount projections 43 are provided, the mount projections 43 may cover areas from the leading edges 40 or trailing edges 42 of the nozzle vanes 27 to positions near the shafts 35, in the chord direction of the nozzle vanes 27.

With this configuration, the plate projections 41 can cover substantially the entire areas in which the exhaust gas leaks from the gap between the nozzle vanes 27 and the nozzle plate 33 (indicated by dashed-line arrows in FIG. 14), in the chord direction of the nozzle vanes 27.

Accordingly, because it is possible to substantially completely cover the gap between the nozzle vanes 27 and the nozzle plate 33, it is possible to further suppress a decrease in efficiency of the variable geometry radial turbine 1 occurring when the flow rate is low.

Note that the tapered outer-circumferential surfaces 51 and the tapered inner-circumferential surfaces 53 may be omitted, or either the tapered outer-circumferential surfaces 51 or the tapered inner-circumferential surfaces 53 may be omitted.

Note that the present invention is not limited to the above-described embodiments, and various modifications are possible within a scope that does not depart from the spirit of the present invention.

For example, although the present invention is applied to the variable geometry radial turbine 1 in this embodiment, it may be applied to a mixed-flow turbine.

REFERENCE SIGNS LIST

1: variable geometry radial turbine
23: fluid inlet flow path
27: nozzle vane
29: nozzle mount
33: nozzle plate
35: shaft
40: leading edge
41: plate projection
42: trailing edge
43: mount projection
51: tapered outer-circumferential surface
53: tapered inner-circumferential surface
S: flow path cross-sectional area

The invention claimed is:

1. A variable geometry turbine comprising:
a fluid space that is formed in a donut shape by a pair of ring-like opposing surfaces arranged to face each other with a certain distance therebetween and that allows fluid flowing from an outer circumferential side to be discharged toward an inner circumferential side; and
a plurality of nozzle vanes arranged in the fluid space at certain intervals in a circumferential direction so as to partition the fluid space, the nozzle vanes being supported by shafts on one of the opposing surfaces in such a manner as to be capable of turning;
wherein the nozzle vanes are made to turn on the shafts to open or close throat spaces formed by adjacent nozzle vanes, so that the flow rate of the fluid can be adjusted,
at least one of the pair of opposing surfaces is provided with projections protruding toward the nozzle vanes further than, at least, end surfaces of the nozzle vanes so that the throat spaces formed between leading edges of the nozzle vanes and trailing edges of the nozzle vanes adjacent thereto have a reduced height in a direction along the shafts when the nozzle vanes are at a closed position, and
the projections are provided so as to entirely cover the throat spaces between the leading edges of the nozzle vanes and the trailing edges of the nozzle vanes adjacent thereto when the nozzle vanes are at the closed position.

2. The variable geometry turbine according to claim 1, wherein a tapered outer-circumferential surface, which is tapered toward each of the projections so as to approach each of the nozzle vanes, is provided on an outer circumferential side of the each of the projections.

3. The variable geometry turbine according to claim 2, wherein a tapered inner-circumferential surface, which is tapered toward the each of the projections so as to approach the each of the nozzle vanes, is provided on an inner circumferential side of the each of the projections.

4. The variable geometry turbine according claim 3, wherein the projections cover portions from the leading edges or the trailing edges of the nozzle vanes to positions adjacent to the shafts, in a chord direction of the nozzle vanes.

5. The variable geometry turbine according claim 2, wherein the projections cover portions from the leading edges or the trailing edges of the nozzle vanes to positions adjacent to the shafts, in a chord direction of the nozzle vanes.

6. The variable geometry turbine according to claim 1, wherein a tapered inner-circumferential surface, which is tapered toward each of the projections so as to approach each of the nozzle vanes, is provided on an inner circumferential side of the each of the projections.

7. The variable geometry turbine according claim 6, wherein the projections cover portions from the leading edges or the trailing edges of the nozzle vanes to positions adjacent to the shafts, in a chord direction of the nozzle vanes.

8. The variable geometry turbine according to claim 1, wherein the projections cover portions from the leading edges or the trailing edges of the nozzle vanes to positions adjacent to the shafts, in a chord direction of the nozzle vanes.

* * * * *